(12) United States Patent
Zhou et al.

(10) Patent No.: US 9,622,162 B1
(45) Date of Patent: Apr. 11, 2017

(54) CLIENT-SERVER NETWORK SELECTION

(71) Applicant: Sprint Spectrum LP, Overland Park, KS (US)

(72) Inventors: Yu Zhou, Herndon, VA (US); Chunmei Liu, Great Falls, VA (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 13/725,996

(22) Filed: Dec. 21, 2012

(51) Int. Cl.
*H04W 4/00* (2009.01)
*H04W 36/00* (2009.01)
*H04W 48/18* (2009.01)

(52) U.S. Cl.
CPC .................................. *H04W 48/18* (2013.01)

(58) Field of Classification Search
CPC ....................... H04W 36/0016; H04W 36/0094
See application file for complete search history.

(56) References Cited

U.S. PATENT DOCUMENTS

| | | | |
|---|---|---|---|
| 2004/0203788 A1* | 10/2004 | Fors et al. | 455/439 |
| 2010/0216475 A1* | 8/2010 | Hoole | 455/436 |
| 2011/0164593 A1* | 7/2011 | Huet et al. | 370/333 |

* cited by examiner

*Primary Examiner* — Joshua Schwartz

(57) ABSTRACT

An application processing element in a first wireless communication network receives a first indicator associated with an availability of a first access node in the first wireless communication network to serve a wireless device. The wireless device being served by a first active connection with a second wireless communication network. In response to a first request by the wireless device, the application processing element sends a second indicator to the wireless device. The second indicator is associated with the availability of the first access node in the first wireless communication network to serve the wireless device. The wireless device ending the first active connection based on the first indicator and the signal strength associated with the first access node.

13 Claims, 6 Drawing Sheets

CLIENT-SERVER NETWORK SELECTION

TECHNICAL BACKGROUND

From time-to-time, a wireless device such as a Smartphone may be served by networks that belong to a diversity of carriers. For example, the wireless device's primary carrier may not be available in the area where the wireless device is located. In this case, the primary carrier may have an agreement with a second carrier to allow the wireless device to "roam" in the second carrier's service area. In addition, a carrier may move a wireless device being served by its network, to that of a partner in order to reduce the load on the carrier's primary network.

A carrier may, however, have a preference for which network is used to serve the wireless device. This preference may change from time-to-time according to conditions in the networks available to serve the wireless device, the location of the wireless device, or other reasons. Accordingly, when a wireless device is being served by a network which is not preferred, the wireless device may need to be moved to the preferred network.

Overview

In an embodiment, an application processing element in a first wireless communication network receives a first indicator associated with an availability of a first access node in the first wireless communication network to serve a wireless device. The wireless device being served by a first active connection with a second wireless communication network. In response to a first request by the wireless device, the application processing element sends a second indicator to the wireless device. The second indicator is associated with the availability of the first access node in the first wireless communication network to serve the wireless device. The wireless device sending the first request in response to a signal strength associated with the first access node. The wireless device ending the first active connection based on the first indicator and based on a third indicator of a signal strength associated with the first access node. In response to a second request by the wireless device, the first wireless communication network, provisions a second active connection with the wireless device to serve the wireless device with the first wireless communication network.

In an embodiment, a communication system includes an application processing element in a first wireless communication network. The application processing element is configured to receive a first indicator associated with an availability of a first access node in the first wireless communication network to serve a wireless device. The wireless device currently being served by a first active connection with a second wireless communication network. The application processing element is configured to send a second indicator to the wireless device in response to a first request by the wireless device. The second indicator is associated with the availability of the first access node in the first wireless communication network to serve the wireless device. The wireless device is configured to send the first request in response to a signal strength associated with the first access node. The wireless device is also configured to end the first active connection based on the second indicator and based on a third indicator of a signal strength associated with the first access node. The first wireless communication network is also configured to, in response to a second request by the wireless device, provision a second active connection with the wireless device in order to serve the wireless device with the first wireless communication network.

In an embodiment, a first indicator associated with an availability of a first access node in a first wireless communication network to serve the wireless device is received from an application processing element in the first wireless communication network. The wireless device is currently being served by a first active connection with a second wireless communication network. A signal strength associated with the first access node is determined. The first active connection is ended based on the first indicator and based on a second indicator of the signal strength associated with the first access node. After ending the first active connection, the first wireless communication network is requested to serve the wireless device.

DETAILED DESCRIPTION

In an embodiment, a wireless device is being served by a low priority network. For example, the wireless device may have been moved to the low priority network when the home (e.g., high priority) network is unreachable. In another example, the wireless device may have been moved to the low priority network when the high priority network is overloaded. When the high priority network becomes available, the wireless device can break (e.g., disconnect) the connection with the low priority network and connect to the high priority network. In this manner, the wireless device can move from the low priority network to the high priority network without receiving permission from the low priority network.

In an embodiment, the wireless device bases the decision to disconnect from the low priority network based on the load on, and signal strength of, an access node in the high priority network. In an embodiment, while connected to the low priority network, the wireless device measures the signal strength of an access node in the high priority network. When that signal strength meets a threshold requirement, the wireless device retrieves an indicator of the load on the access node. The load on the access node is retrieved from an application server in high priority network using client software installed on the wireless device. This communication between the client and server can be done at the application protocol layer so that it is transparent to the low priority network. When the load is below a threshold, the wireless device can actively break the connection to the low priority network and connect to the high priority network.

Figure 1:
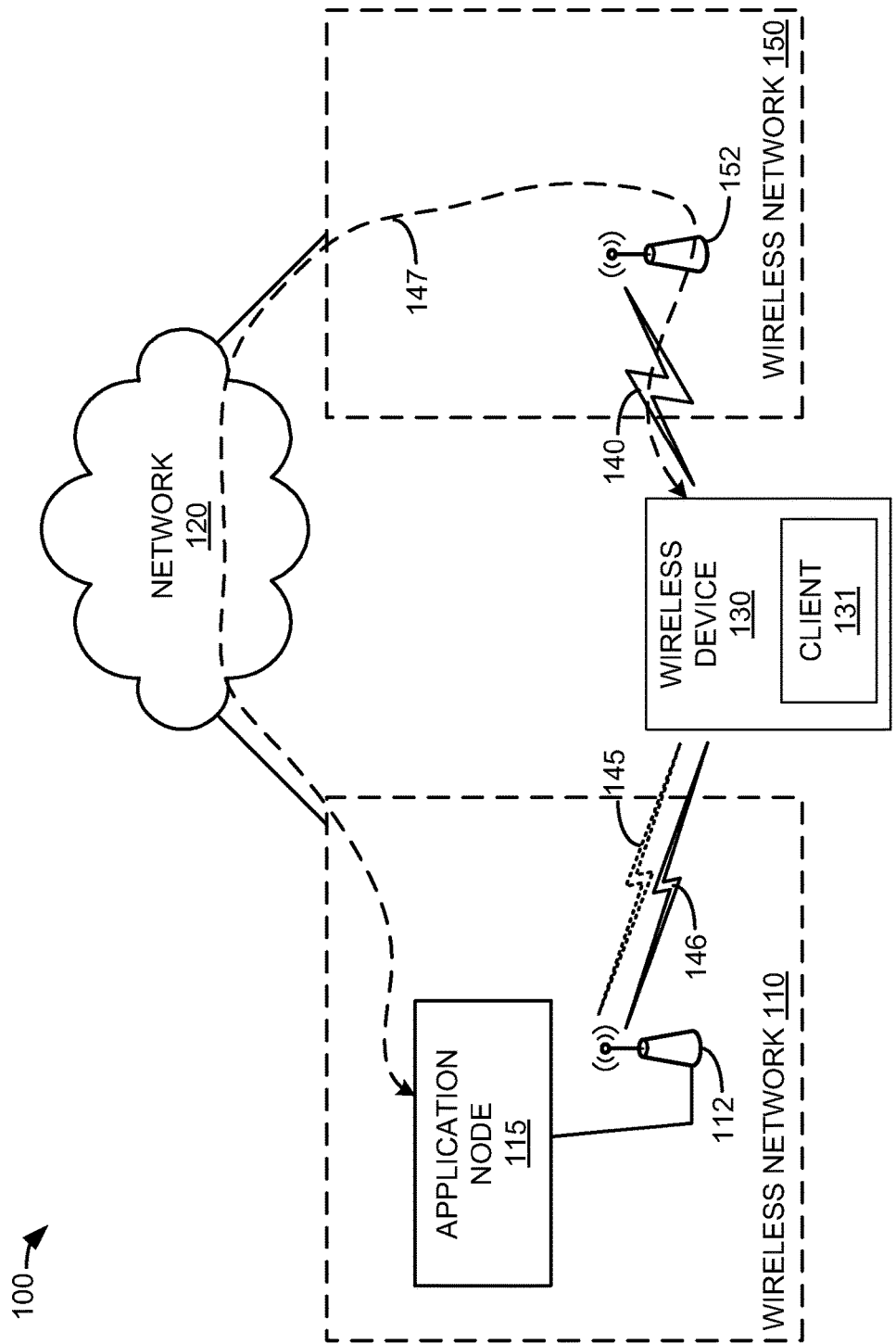
FIG. 1 is a block diagram illustrating an exemplary communication system.

Referring to FIG. 1, communication system 100 comprises wireless network 110, wireless link 140, wireless link 145, wireless link 146, control channel 147, network 120, wireless device 130, and wireless network 150. Wireless network 110 includes access node 112 and application node 115. Wireless network 150 includes access node 152. Wireless network 110 is operatively coupled to network 120.

Wireless network 150 is operatively coupled to network 120. Thus, wireless network 110 may be operatively coupled to wireless network 150 via network 120. In addition, wireless network 110 may be operatively coupled directly or indirectly to wireless network 150 without the use of network 120. Wireless device 130 is operatively coupled to access node 152 via wireless link 140. Wireless device includes application client 131.

Wireless device 130 may be operatively coupled to access node 112 via wireless link 145. Wireless device 130 may be operatively coupled to access node 112 via wireless link 146. Application node 115 may communicate with wireless device 130 (and client 131, in particular) via application channel 147. Application channel 147 can be established between client 131 running on wireless device 130 and application server 115 in wireless network 110 when wireless device 130 is being served by wireless network 150. Application channel 147 can enable communication between, for example, application server 115 and wireless device 130 that takes place at the application protocol layer and is thus transparent to wireless network 130. Application channel 147 can be established via wireless network 110, network 120, and wireless network 150 (and via access node 152, in particular).

Access node 112 is a network node capable of providing wireless communication to wireless device 130. Access node 112 can be, for example, a base transceiver station, a radio base station, an eNodeB device, or an enhanced eNodeB device. Access node 112 communicates system information to wireless device 130 via wireless link 145. This system information may be communicated on a unicast (broadcast) paging channel. Wireless link 145 can be a broadcast communication link.

Wireless network 110 and wireless network 150 are communication networks that can provide wireless communication to wireless device 130. Network 120 is a communication network that can provide communication between wireless network 110 and wireless network 150. Wireless network 110, wireless network 150, and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 110, wireless network 150, and network 120 can also comprise wireless networks, including base station, wireless communication nodes, telephony switches, internet routers, network gateways, computer systems, communication links, or some other type of communication equipment, and combinations thereof.

Wired network protocols that may be utilized by wireless network 110, wireless network 150, and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 110, wireless network 150, and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between wireless network 110 and network 120, and between network 120 and wireless network 150, can be, for example, twisted pair cable, coaxial cable or fiber optic cable, or combinations thereof. Wireless link 140, wireless link 145, and/or wireless link 146 can be a radio frequency, microwave, infrared, or other similar signal. Wireless link 140, wireless link 145, and/or wireless link 146 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in wireless network 110, network 120, and wireless network 150, in particular) to facilitate wireless communication to/from wireless device 130 but are omitted for clarity, such as base station, base station controllers, gateways, mobile switching centers, dispatch application processors, and location registers such as a home location register or visitor location register. Furthermore, other network elements may be present to facilitate communication between access node 112 and wireless network 110 which are omitted for clarity, including additional processing nodes, routers, gateways, and physical and/or wireless data links for carrying data among the various network elements. Likewise, other network elements may be present to facilitate communication between access node 152 and wireless network 150 which are also omitted for clarity, including additional processing nodes, routers, gateways, and physical and/or wireless data links for carrying data among the various network elements.

Wireless device 130 may be any device, system, combination of devices, or other such communication platform capable of communicating wirelessly with wireless network 110 and wireless network 150. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 110 via access node 112, and with wireless network 150 via access node 152. Other types of communication platforms are possible.

Wireless device 130 may establish a communication session with wireless network 110 in order to receive communication service. Wireless network 110 may be a home (or primary, preferred, or high priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 130 may establish a communication session with wireless network 150 in order to receive communication service. Wireless network 150 may be a roaming (or non-preferred, or low priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, wireless device 130 is, at first, being served by wireless network 150 via wireless link 140. In other words, wireless link 140 is the primary communication path for wireless device 130 to receive communication service. Application node 115 can repeatedly poll access node 112 for an indicator of the load on access node 112. In response, access node 112 sends an indicator of the load on access node 112 to application node 115. Access node 112 can send the indicator of the load on access node 112 to application node 115 via a control channel. Application node 115 can repeatedly poll other access nodes in wireless network 110 (not shown in FIG. 1) for indicators of the load on them. Thus, Application node 115 can maintain a dynamic database of indicators associated with the ability of each of a plurality of access nodes to serve wireless device 130.

Wireless device 130 can also measure a signal strength associated with access node 112. This measurement can result in an indicator of a signal strength associated with access node 112. This indicator of signal strength associated with access node 112 can be derived from the signal strength of wireless link 145. Wireless device 130 may measure the signal strength associated with access node 112 during discontinuous reception cycles.

In an embodiment, when wireless device 130 detects that the indicator of signal strength associated with access node 112 meets a first threshold (e.g., $Th_{signal}$), wireless device 130 can request an indicator of the load on access node 112 from application server 115. Wireless device 130 can request the indicator of the load on access node 112 from application server 115 using an application layer protocol.

When wireless device 130 receives the indicator associated with the availability of wireless network 110 to serve wireless device 130 that meets a second threshold (e.g., $Th_{load}$), wireless device 130 can actively break its active connection (i.e., wireless link 140) with wireless network 150. For example, when wireless device 130 receives a load indicator that is lower than threshold $Th_{load}$, and had previously measured a signal strength associated with access node 112 that is greater than threshold $Th_{signal}$, wireless device 130 may "hang up" on wireless network 150.

After disconnecting from wireless network 150, wireless device 130 may connect to wireless network 110. Wireless device 130 may connect to wireless network 110 by requesting an active connection with wireless network 110. To connect wireless device 130 to wireless network 110, wireless network 110 may provision wireless link 146.

Figure 2:
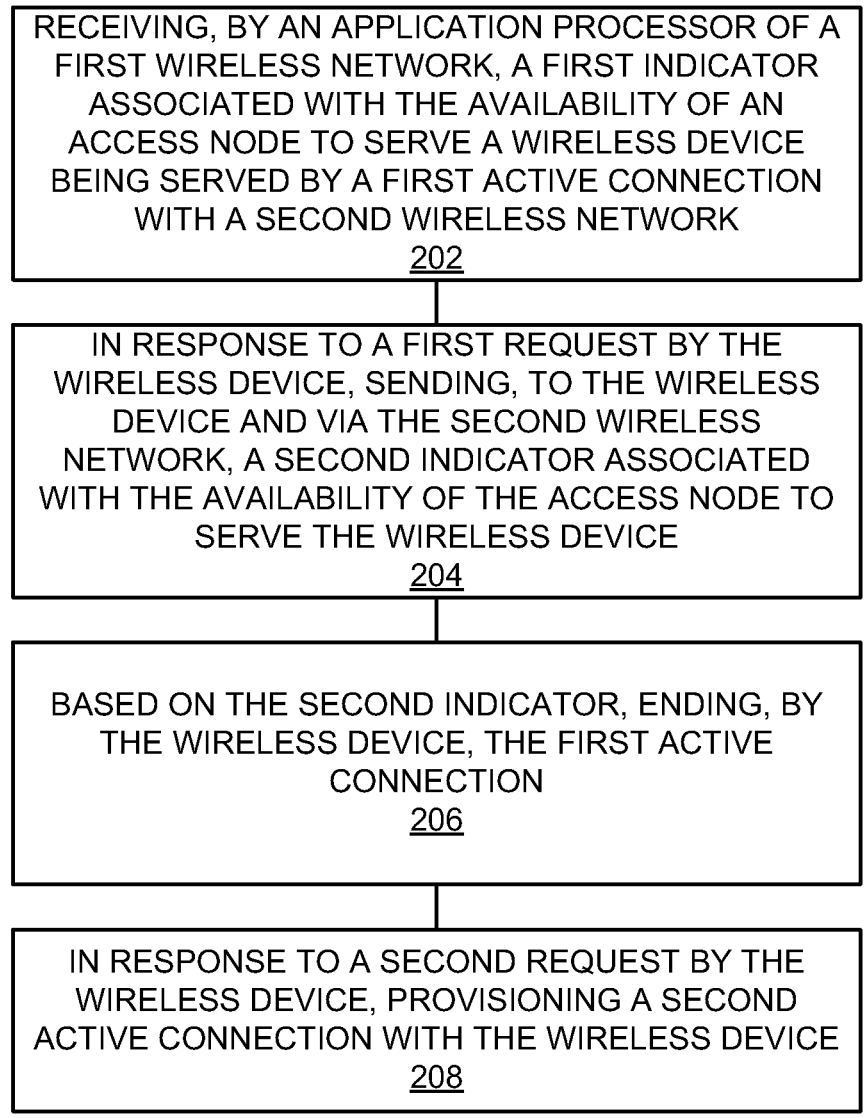
FIG. 2 is a flowchart illustrating an exemplary method of operating a communication system.

FIG. 2 is a flowchart illustrating an exemplary method of operating a communication system. The steps illustrated in FIG. 2 may be performed by one or more elements of communication system 100. An application processor in a first wireless network receives a first indicator associated with the availability of an access node to serve a wireless device being served by a first active connection with a second wireless network (202). For example, application node 115 may receive an indicator of the load on access node 112.

In response to a first request by the wireless device, a second indicator associated with the availability of the access node to serve the wireless device is sent to the wireless device via the second wireless network (204). For example, wireless device 130 may request the load on access node 112. Application client 131 running on wireless device 130 may request, via access node 152, the load on access node 112 from a server program (application) running on application node 115. Application client 131 running on wireless device 130 may request the load on access node 112 from application node 115 using application layer protocols that are transparent to wireless network 150. Wireless device 130 (e.g., application client 132) may request the load on access node 112 in response to a signal strength, as measured by wireless device 130, meeting a threshold requirement.

Based on the second indicator, the wireless device ends the first active connection with the second wireless network (206). For example, based on an indicator of the load on access node 112 received from application server 115, wireless device 130 may disconnect from wireless network 150 (and access node 152, in particular).

In response to a second request by the wireless device, a second active connection is provisioned with the wireless device (208). For example, after disconnecting from wireless network 150, wireless device 130 can request, from wireless network 110, a connection to wireless network 110. In response to this connection request from wireless device 130, wireless network 110 can provision wireless link 146.

Figure 3:
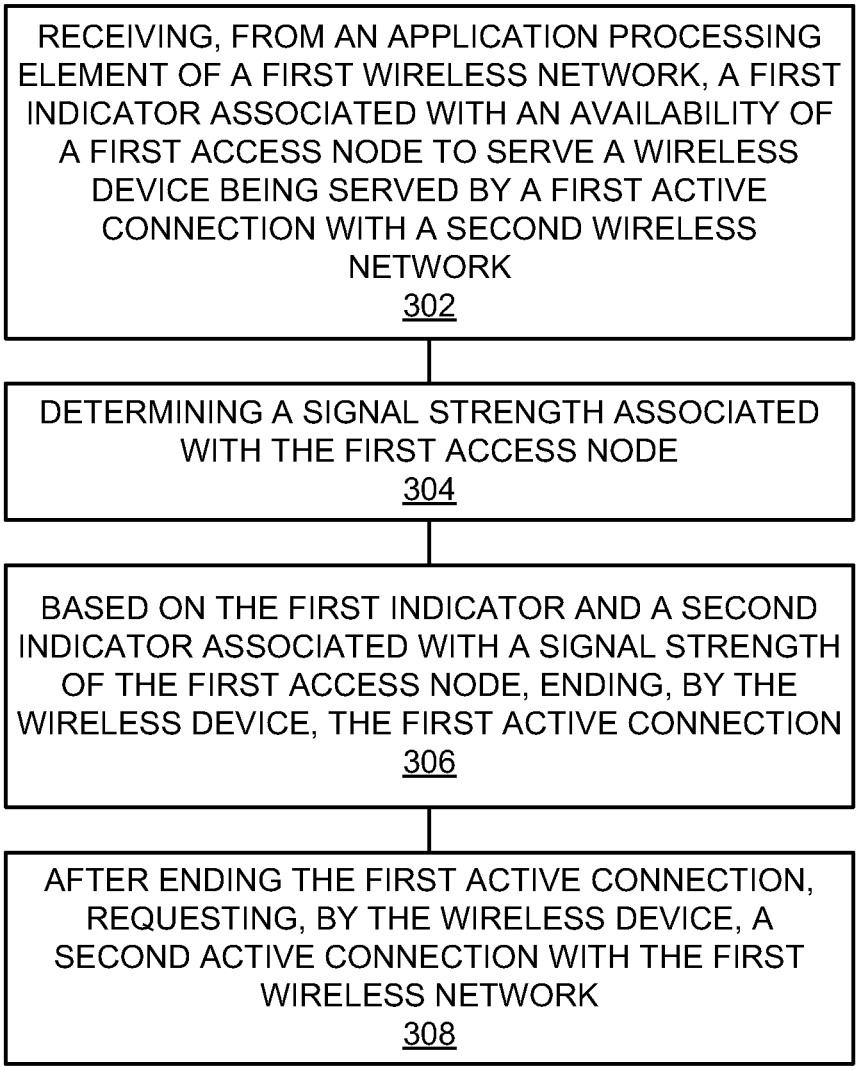
FIG. 3 is a flowchart illustrating another exemplary method of operating a communication system.

FIG. 3 is a flowchart illustrating another exemplary method of operating a communication system. The steps illustrated in FIG. 3 may be performed by one or more elements of communication system 100. From an application processing element of a first wireless network, a first indicator associated with an availability of a first access node to serve a wireless device being served by a first active connection with a second wireless network is received (302). For example, while being served by wireless network 150 via wireless link 140, wireless device 130 (and client 131, in particular) can receive, from application node 115, an indicator of the load on access node 112.

A signal strength associated with the first access node is determined (304). For example, wireless device 130 can measure a signal strength associated with access node 112. Wireless device 130 may measure the signal strength associated with access node 112 in response to receiving an indicator of the load on access node 112 that meets a threshold requirement. Based on the first indicator, and a second indicator of a signal strength associated with the first access node, the first active connection is ended by the wireless device (306). For example, based on the indicator of the load on access node 112, and a signal strength measurement associated with access node 112 made by wireless device 130, wireless device 130 can actively end wireless link 140.

After ending the first active connection, a second active connection with the first wireless network is requested by the wireless device (308). For example, after disconnecting from wireless network 150, wireless device 130 can request to be served by wireless network 110. Wireless network 110 can respond to this request by establishing wireless link 146.

Figure 4:
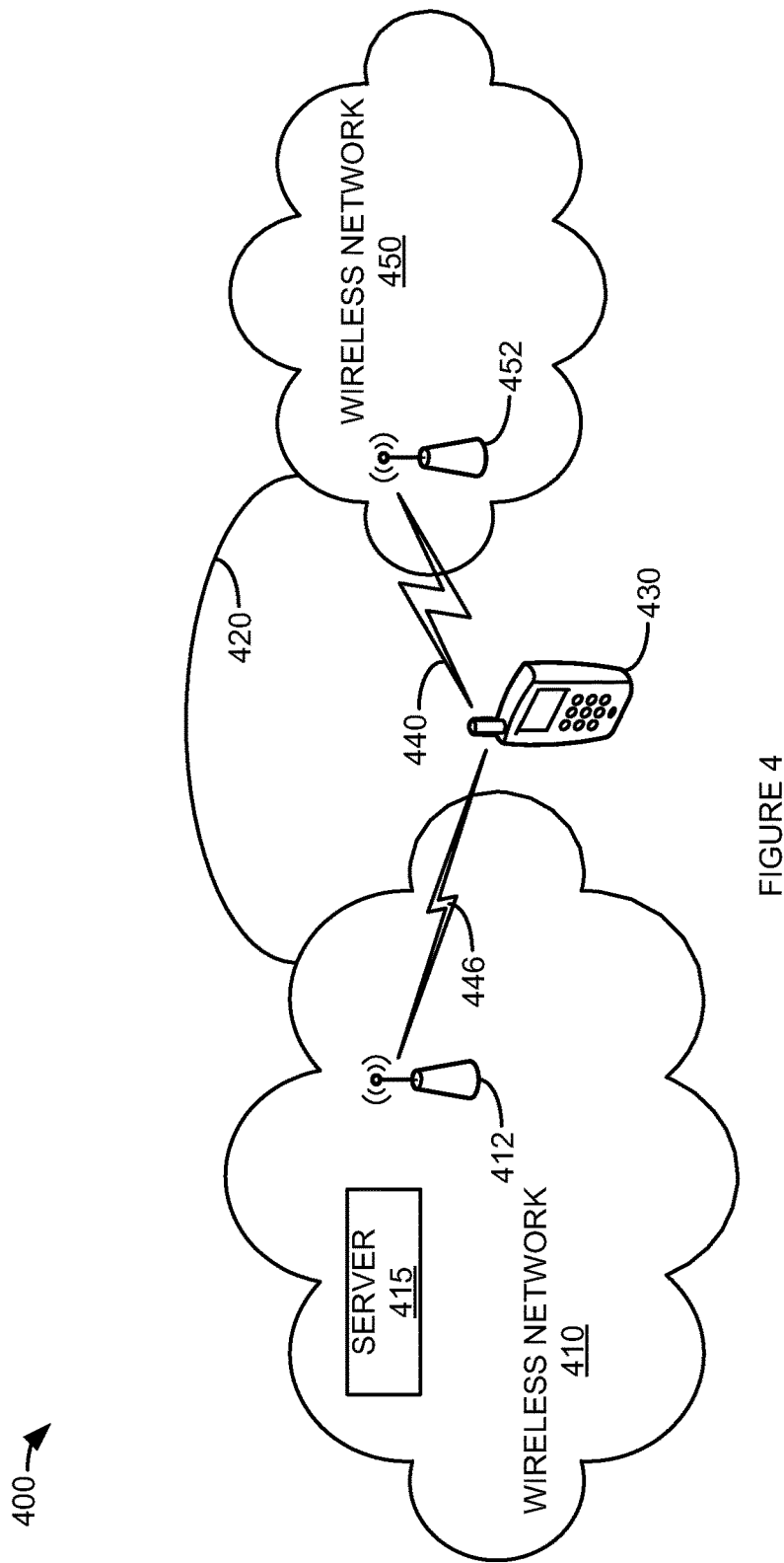
FIG. 4 is a block diagram illustrating a communication system.

FIG. 4 is a block diagram illustrating a communication system. In FIG. 4, communication system 400 comprises wireless network 410, wireless network 450, and wireless device 430. Wireless network 410 and wireless network 450 are operatively coupled by link 420. Wireless network 410 includes access node 412 and server 415. Wireless network 450 includes access node 452.

Wireless network 410 and wireless network 450 are communication networks that can provide wireless communication to wireless device 430. Wireless network 410 and wireless network 450 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 410 and wireless network 450 can also comprise wireless networks, including base stations, wireless communication nodes, telephony switches, internet routers, network gateways, computer systems, communication links, or some other type of communication equipment, and combinations thereof.

Wired network protocols that may be utilized by wireless network 410 and wireless network 450 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 410 and wireless network 450 can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless link 440 and wireless link 446 can be radio frequency, microwave, infrared, or other similar signal. Wireless link 440 and/or wireless link 446 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 (and present in wireless network 410 and wireless network 450, in particular) to facilitate wireless communication to/from wireless device 430 but are omitted for clarity, such as base stations, base station controllers, gateways, mobile switching centers, dispatch application processors, and location registers such as a home location register or visitor location register. Furthermore, other network elements may be present to facilitate communication between access node 412 and wireless network 410 which are omitted for clarity, including additional processing nodes, routers, gateways, and physical and/or wireless data links for carrying data among the various network elements. Likewise, other network elements may be present to facilitate communication between access node 452 and wireless network 450 which are also omitted for clarity, including additional processing nodes, routers, gateways, and physical and/or wireless data links for carrying data among the various network elements.

Wireless device 430 may be any device, system, combination of devices, or other such communication platform capable of communicating wirelessly with wireless network 410 and wireless network 450. Wireless device 430 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 410 via access node 412, and with wireless network 450 via access node 452. Other types of communication platforms are possible.

Wireless device 430 may establish a communication session with wireless network 410 in order to receive communication service. Wireless network 410 may be a home (or primary, preferred, or high priority) network to wireless device 430. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 430 may establish a communication session with wireless network 450 in order to receive communication service. Wireless network 450 may be a roaming (or non-preferred, or low priority) network to wireless device 430. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 412 and access node 452 are network nodes capable of providing wireless communication to wireless device 430. Access node 412 and/or access node 452 can be, for example, a base transceiver station, a radio base station, an eNodeB device, or an enhanced eNodeB device. Access node 412 can communicate system information to wireless device 430. This system information may be communicated on a unicast (broadcast) paging channel. Access node 452 can communicate control channel traffic to wireless device 430 via wireless link 440. Access node 452 can communicate control channel traffic from wireless network 410 to wireless device 430 via wireless link 440.

In an embodiment, wireless device 430 may have, at first, a first active connection with wireless network 450 via wireless link 440. In other words, wireless link 440 is the primary communication path for wireless device 430 to receive communication service. Wireless network 450 can be a low priority network to wireless device 430.

While wireless device 430 has the first active connection with wireless network 450, traffic communicated to wireless device 430 can be routed through wireless network 410. Wireless device 430 may also receive, from wireless network 410 and server 415, in particular, a first indicator that is associated with an availability of wireless network 410 to serve wireless device 430. Wireless network 410 can be a higher priority network than wireless network 450 is to wireless device 430. This first indicator may be associated with a load on access node 412. Wireless device 430 may receive this first indicator via an application protocol message sent from server 415.

Wireless device 430 can measure or receive a second indicator that is associated with a signal strength of access node 412. In response to the first indicator and the second indicator, wireless device 430 can break the first active connection with wireless network 450. For example, when wireless device 430 receives a load indicator that is lower than threshold $Th_{load}$, and determines that the second indicator is greater than threshold $Th_{signal}$, wireless device 430 may break the first active connection.

Wireless device 430 can establish a second active connection with wireless network 410. In other words, after breaking wireless link 440, wireless device 430 can establish wireless link 440 is the primary communication path for wireless device 430 to receive communication service.

Figure 5:
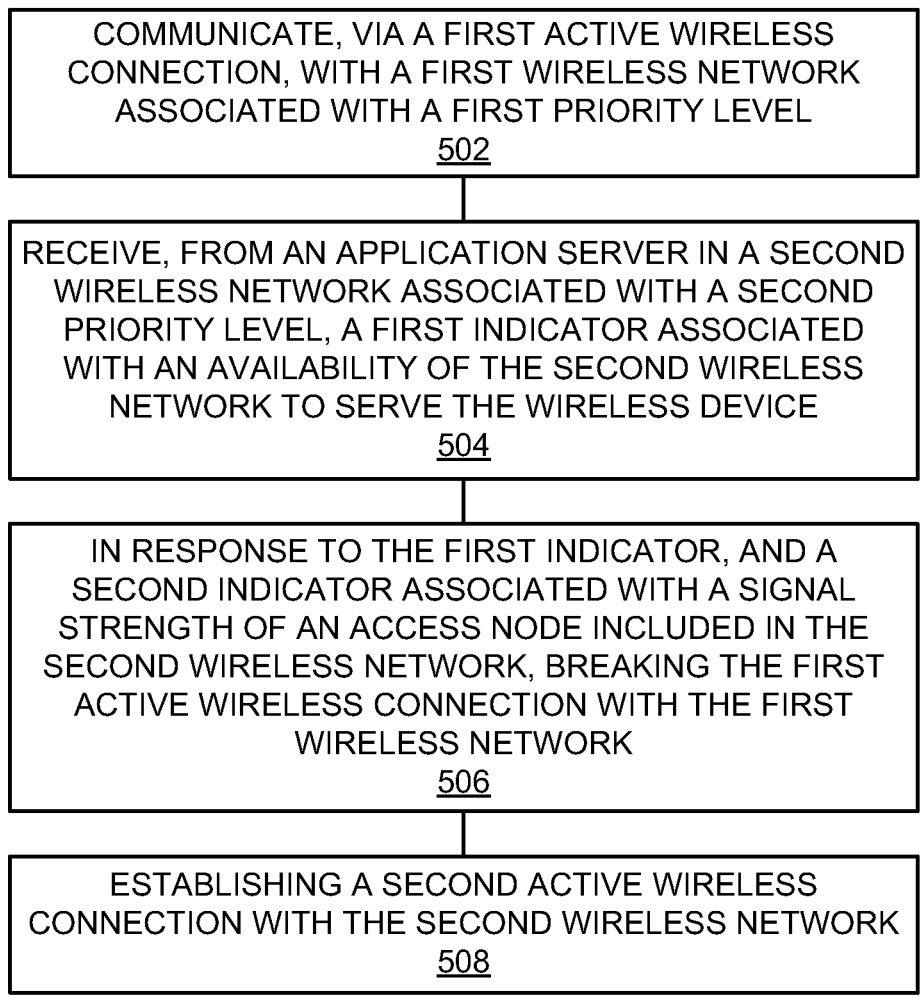
FIG. 5 is a flowchart illustrating an exemplary method for operating a wireless device.

FIG. 5 is a flowchart illustrating an exemplary method for operating a wireless device. The steps illustrated in FIG. 5 can be performed by elements of communication system 100 and/or communication system 400. Via a first active wireless connection, a first wireless network associated with a first priority level is communicated with (502). For example, wireless device 430 may communicate with wireless network 450 using wireless link 440 as the primary communication path for wireless device 430 to receive communication service.

From an application server in a second wireless network associated with a second priority level, a first indicator associated with an availability of the second wireless network to serve the wireless device is received (504). For example, wireless device 430 may receive, from server 415, an indicator associated with the availability of wireless network 410 to serve as the primary communication path for wireless device 430 to receive communication service. This indicator may, for example, be associated with a load on access node 412.

In response to the first indicator, and a second indicator associated with a signal strength of an access node included in the second wireless network, the first active connection with the first wireless network is broken (506). For example, in response to the indicator associated with the availability of wireless network 410 to serve as the primary communication path for wireless device 430, and an indicator of the signal strength of access node 412, wireless device 430 may break its connection with wireless network 450 as the primary communication path for wireless device 430 to receive communication service. Wireless device 430 may measure or receive the indicator of the signal strength associated with access node 412.

A second active connection with the second wireless network is established (508). For example, after disconnecting from wireless network 450, wireless device 430 may connect with wireless network 410 as the primary communication path for wireless device 430 to receive communication service.

Figure 6:
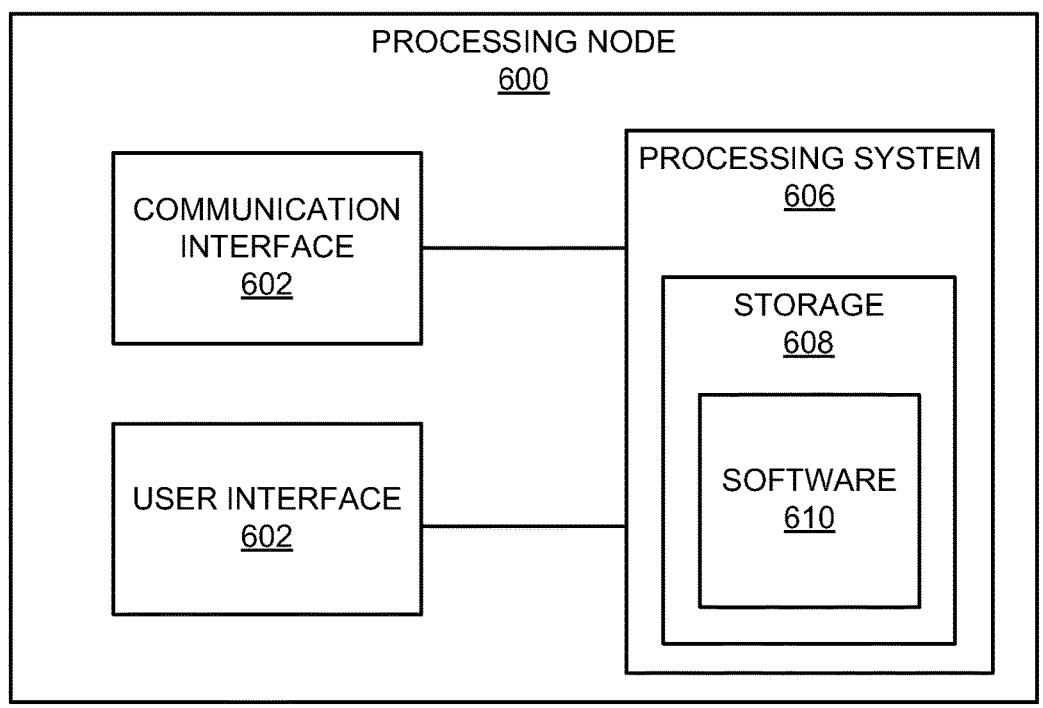
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node selection 410. Processing node 600 can also be an adjunct or component of a network element, such as an element of access node 112, 152, 412 and/or 452, a mobility management entity, a gateway, a proxy node, an application server, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for disconnecting a roaming wireless device from a wireless network, the method comprising:
    sending, via an application processing node of a preferred wireless network, a load indicator associated with an access node of the preferred wireless network to the roaming wireless device and, when the load indicator meets a first threshold, instructing the roaming wireless device via an application layer of the roaming wireless device to measure a signal strength indicator of the access node of the preferred wireless network;
    when the measured signal strength indicator of the access node of the preferred wireless network meets a second threshold, instructing the roaming wireless device via the application processing node of the preferred network to break a first active connection with an access node of a non-preferred wireless network, wherein the roaming wireless device is configured to break the first active connection with the access node of the non-preferred wireless network on receipt of the instruction at the application layer of the roaming wireless device and without permission from the non-preferred wireless network; and
    provisioning, by the application processing node of the preferred wireless network, a second active connection between the access node of the preferred wireless network and the roaming wireless device.

2. The method of claim 1, wherein the first threshold is a loading level that is less than a threshold load and that had a previously measured signal strength associated with the at least one access node that exceeds the second threshold.

3. The method of claim 1, wherein the load indicator associated with the access node of the preferred wireless network include the availability of the access node of the preferred wireless network to serve the roaming wireless device.

4. The method of claim 1, wherein the roaming wireless device breaks the first active connection with the access node of the non-preferred wireless network when the signal strength associated with the access node of the preferred wireless network is less than a signal strength of the access node of the non-preferred wireless network actively serving the roaming wireless device.

5. The method of claim 1, wherein the signal strength of the access node of the preferred wireless network is determined during a discontinuous reception cycle.

6. A communication system, comprising:
an application processing node of a preferred wireless network configured to:
send a load indicator associated with an access node of the preferred wireless network to a roaming wireless device;
when the load indicator meets a first threshold, instruct the roaming wireless device via an application layer of the roaming wireless device to measure a signal strength indicator of the access node of the preferred wireless network;
when the measured signal strength indicator of the access node of the preferred wireless network meets a second threshold, instruct the roaming wireless device via the application layer of the roaming wireless device to break a first active connection with an access node of a non-preferred wireless network without permission from the non-preferred wireless network; and,
provision a second active connection between the access node of the preferred wireless network and the roaming wireless device.

7. The communication system of claim 6, wherein the first threshold is a loading level that is less than a threshold load and that had a previously measured signal strength associated with the at least one access node that exceeds the second threshold.

8. The communication system of claim 6, wherein the roaming wireless device is configured to break the first active connection with the access node of the non-preferred wireless network when the signal strength associated with the access node of the preferred wireless network is less than a signal strength of the access node of the non-preferred wireless network actively serving the roaming wireless device.

9. The system of claim 6, wherein the roaming wireless device requests the signal strength of the access node of the preferred wireless network during a discontinuous reception cycle.

10. A method of operating a roaming wireless device, comprising:
polling, at an application processing element of the roaming wireless device, a first indicator associated with an availability of an access node served by a preferred wireless network to serve the roaming wireless device, wherein the roaming wireless device is actively connected to a non-preferred wireless network;
instructing, via an application layer of the roaming wireless device, the roaming wireless device to measure a signal strength associated with the access node of the preferred wireless network;
requesting, from the application processing element via the application layer of the roaming wireless device, transmission of the polled first indicator corresponding to the access node of the preferred wireless network;
determining that the transmitted polled first indicator meets a first threshold;
when the measured signal strength of the access node of the preferred wireless network meets a second threshold, instructing the roaming wireless device via the application layer of the roaming wireless device to break the active connection to the non-preferred wireless network without permission from the non-preferred wireless network; and,
instructing, by the application processing element and via the application layer of the roaming wireless device, the access node of the preferred wireless network to establish an active connection with the roaming wireless device.

11. The method of claim 10, wherein the first indicator corresponds to a load on the access node.

12. The method of claim 10, wherein the roaming wireless device breaks the active connection with the non-preferred wireless network at a time when the signal strength associated with the access node of the preferred wireless network is less than a signal strength of an access node of the non-preferred wireless network actively serving the roaming wireless device.

13. The method of claim 10, wherein the signal strength associated with the access node of the preferred wireless network is determined during a discontinuous reception cycle.

* * * * *